United States Patent
Vayssieres et al.

(10) Patent No.: US 11,407,520 B2
(45) Date of Patent: Aug. 9, 2022

(54) REAR ENGINE ATTACHMENT FOR AN AIRCRAFT ENGINE

(71) Applicant: Airbus Operations SAS, Toulouse (FR)

(72) Inventors: Manon Vayssieres, Toulouse (FR); Michael Berjot, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 284 days.

(21) Appl. No.: 16/872,824

(22) Filed: May 12, 2020

(65) Prior Publication Data
US 2020/0361618 A1     Nov. 19, 2020

(30) Foreign Application Priority Data
May 14, 2019 (FR) ...................................... 1905013

(51) Int. Cl.
*B64D 27/26* (2006.01)

(52) U.S. Cl.
CPC ........ *B64D 27/26* (2013.01); *B64D 2027/262* (2013.01)

(58) Field of Classification Search
CPC .......................... B64D 27/26; B64D 2027/262
See application file for complete search history.

(56) References Cited

U.S. PATENT DOCUMENTS

| | | | |
|---|---|---|---|
| 4,603,822 A * | 8/1986 | Chee ......................... | F02C 7/20 244/54 |
| 4,742,975 A * | 5/1988 | Pachomoff ............. | B64D 27/26 244/54 |
| 5,871,175 A * | 2/1999 | Demouzon ............ | B64D 27/26 60/797 |
| 5,871,177 A * | 2/1999 | Demouzon ............ | B64D 27/26 60/797 |

(Continued)

FOREIGN PATENT DOCUMENTS

| | | |
|---|---|---|
| EP | 0844173 A1 | 5/1998 |
| EP | 1090838 A1 | 4/2001 |

(Continued)

OTHER PUBLICATIONS

French Search Report; priority document.

*Primary Examiner* — Richard R. Green
*Assistant Examiner* — Steven J Shur
(74) *Attorney, Agent, or Firm* — Greer, Burns & Crain, Ltd.

(57) ABSTRACT

A rear engine attachment having first and second parts, wherein the first part has two first clevises fixed to a lower face of a pylon, two second clevises fixed to a structural casing, two connecting rods mounted to be articulated between first and second clevises, and two shafts realizing the connections between the connecting rods and the clevises. The second part has a shoe fixed to the lower face and having a bore, a main rod which bears a vertical peg engaging in the bore and which is fixed to the structural (Continued)

casing by a first pivot connection, and a secondary rod fixed to the main rod by a second pivot connection and to the structural casing by a third pivot connection. Such a rear engine attachment is more compact, taking up space in the longitudinal direction and thus minimizing the space taken up in the transverse direction.

6 Claims, 1 Drawing Sheet

(56) References Cited

U.S. PATENT DOCUMENTS

| | | | | |
|---|---|---|---|---|
| 5,921,500 | A * | 7/1999 | Ellis | B64D 27/20 60/797 |
| 5,927,644 | A * | 7/1999 | Ellis | B64D 27/26 60/797 |
| 6,330,995 | B1 * | 12/2001 | Mangeiga | B64D 27/26 244/54 |
| 6,474,596 | B1 * | 11/2002 | Cousin | B64D 27/26 244/54 |
| 7,909,285 | B2 * | 3/2011 | Dron | B64D 27/26 244/54 |
| 9,708,982 | B2 * | 7/2017 | Chouard | B64D 27/26 |
| 10,189,575 | B2 * | 1/2019 | Ewens | B64D 27/18 |
| 2001/0146200 | | 5/2001 | Cousin et al. | |
| 2014/0033729 | A1 | 2/2014 | Chouard et al. | |
| 2017/0152052 | A1 | 6/2017 | Ewens et al. | |

FOREIGN PATENT DOCUMENTS

| | | | |
|---|---|---|---|
| FR | 2974065 | A1 | 10/2012 |
| FR | 3044297 | A1 | 6/2017 |

* cited by examiner

REAR ENGINE ATTACHMENT FOR AN AIRCRAFT ENGINE

CROSS-REFERENCES TO RELATED APPLICATIONS

This application claims the benefit of the French patent application No. 1905013 filed on May 14, 2019, the entire disclosures of which are incorporated herein by way of reference.

FIELD OF THE INVENTION

The present invention relates to a rear engine attachment for an aircraft engine, and to an aircraft having at least one such rear engine attachment.

BACKGROUND OF THE INVENTION

An aircraft conventionally has a wing beneath which is fixed a pylon to which an engine is fixed. The engine is fixed to the pylon via a system of attachments which is made up, inter alia, of a front engine attachment at the front and a rear engine attachment at the rear. The assembly made up of the pylon and its system of attachments is situated radially above the engine, in a clock sector that can be defined between 10 o'clock and 2 o'clock, and crosses the bypass duct of the engine. In order to reduce aerodynamic disturbances induced by this crossing, the pylon and its system of attachments are faired by an aerodynamic cowling known as a bifurcation. This bifurcation is made up of panels with complex shapes which promote the flow of air in the nacelle and are fixed to the lateral walls of the pylon.

The front engine attachment and the rear engine attachment are conventionally fixed beneath the pylon and the rear engine attachment is designed to react, inter alia, the moment Mx. These various constraints impose particular structures for the engine attachments, which makes them relatively large, taking up a lot of space in the bifurcation crossing the secondary duct of the turbomachine. It is therefore necessary to find new shapes for the engine attachments in order to limit the bulk in this bifurcation and thus to improve the performance of the turbomachine by reducing the aerodynamic blocking of its bypass duct.

SUMMARY OF THE INVENTION

An object of the present invention is to propose a rear engine attachment which is more compact than the rear engine attachment systems of the prior art.

To this end, there is proposed a rear engine attachment for an aircraft, intended to be fixed between a pylon having a lower face and an engine having a structural casing, the rear engine attachment having a first part and a second part,
  wherein the first part has:
    a first port-side clevis intended to be fixed to the lower face,
    a first starboard-side clevis intended to be fixed to the lower face, wherein the two first clevises have a common first clevis axis which is horizontal and perpendicular to a longitudinal direction,
    a second port-side clevis intended to be fixed to the structural casing,
    a second starboard-side clevis intended to be fixed to the structural casing, wherein the two second clevises have a common second clevis axis which is parallel to the first clevis axis,
    a port-side connecting rod mounted so as to be articulated between the first port-side clevis and the second port-side clevis,
    a starboard-side connecting rod mounted so as to be articulated between the first starboard-side clevis and the second starboard-side clevis,
    a first shaft which realizes the connection between the port-side connecting rod and the first port-side clevis, on the one hand, and the connection between the starboard-side connecting rod and the first starboard-side clevis, on the other hand, and
    a second shaft which realizes the connection between the port-side connecting rod and the second port-side clevis, on the one hand, and the connection between the starboard-side connecting rod and the second starboard-side clevis, on the other hand,
  wherein the second part has:
    a shoe intended to be fixed to the lower face and having a bore of which the axis is parallel to a vertical direction,
    a main rod which bears a vertical peg engaging in the bore and which is intended to be fixed to the structural casing by a first pivot connection of which the axis is parallel to the longitudinal direction,
    a secondary rod which is fixed to the main rod by a second pivot connection of which the axis is parallel to the longitudinal direction, and which is intended to be fixed to the structural casing by a third pivot connection of which the axis is parallel to the longitudinal direction.

Such a rear engine attachment is more compact, taking up space in the longitudinal direction and thus minimizing the space taken up in the transverse direction.

Advantageously, the main rod is on the starboard side, and the secondary rod is on the port side.

According to one particular embodiment, the first part is disposed at the rear of the second part relative to the longitudinal direction.

According to another particular embodiment, the second part is disposed at the rear of the first part relative to the longitudinal direction.

Advantageously, the bore is equipped with a ball which is mounted so as to be free to rotate in the bore and which has a central bore in which the vertical peg engages.

The invention also proposes an aircraft having a pylon having a lower face, an engine having a structural casing and a rear engine attachment according to one of the preceding variants, wherein each first clevis is fixed to the lower face, wherein each second clevis is fixed to the structural casing, wherein the shoe is fixed to the lower face, and wherein the main rod and the secondary rod are fixed to the structural casing.

BRIEF DESCRIPTION OF THE DRAWINGS

The abovementioned features of the invention, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
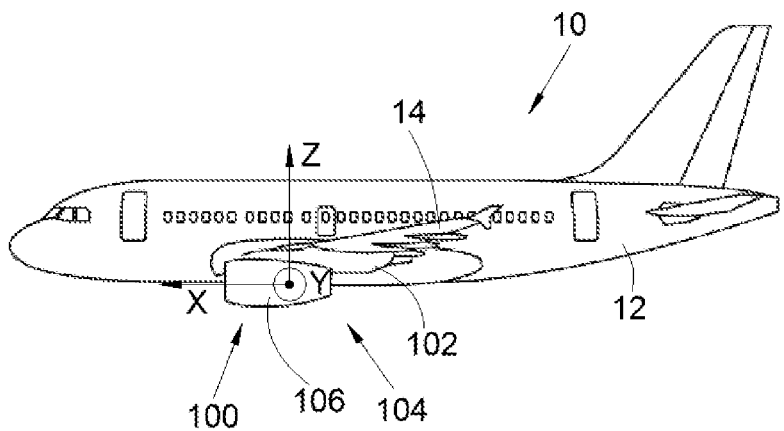
FIG. 1 is a side view of an aircraft having at least one rear engine attachment according to the invention.

In the following description, terms relating to a position are considered in relation to an aircraft in a position of normal forward movement, i.e., as shown in FIG. 1.

FIG. 1 shows an aircraft 10 which has a fuselage 12 having a wing 14 on either side.

Throughout the following description, by convention, the X direction corresponds to the longitudinal direction of the turbomachine, this direction being parallel to the longitudinal axis of this turbomachine. Moreover, the Y direction corresponds to the direction which is transverse relative to the turbomachine, and the Z direction corresponds to the vertical direction or height, these three directions X, Y, Z being mutually orthogonal.

Beneath each wing 14 is fixed at least one propulsion assembly 100 which has a pylon 102 fixed beneath the wing 14 and an engine 104 fixed to the pylon 102. The engine 104 is, for example, a turboshaft engine and it comprises, inter alia, a structural casing which is fixed to the pylon 102 and a nacelle 106 which makes up the aerodynamic fairing of the engine 104 and which is fixed both to the structural casing and to the pylon 102 which takes the form of a box.

Figure 2:
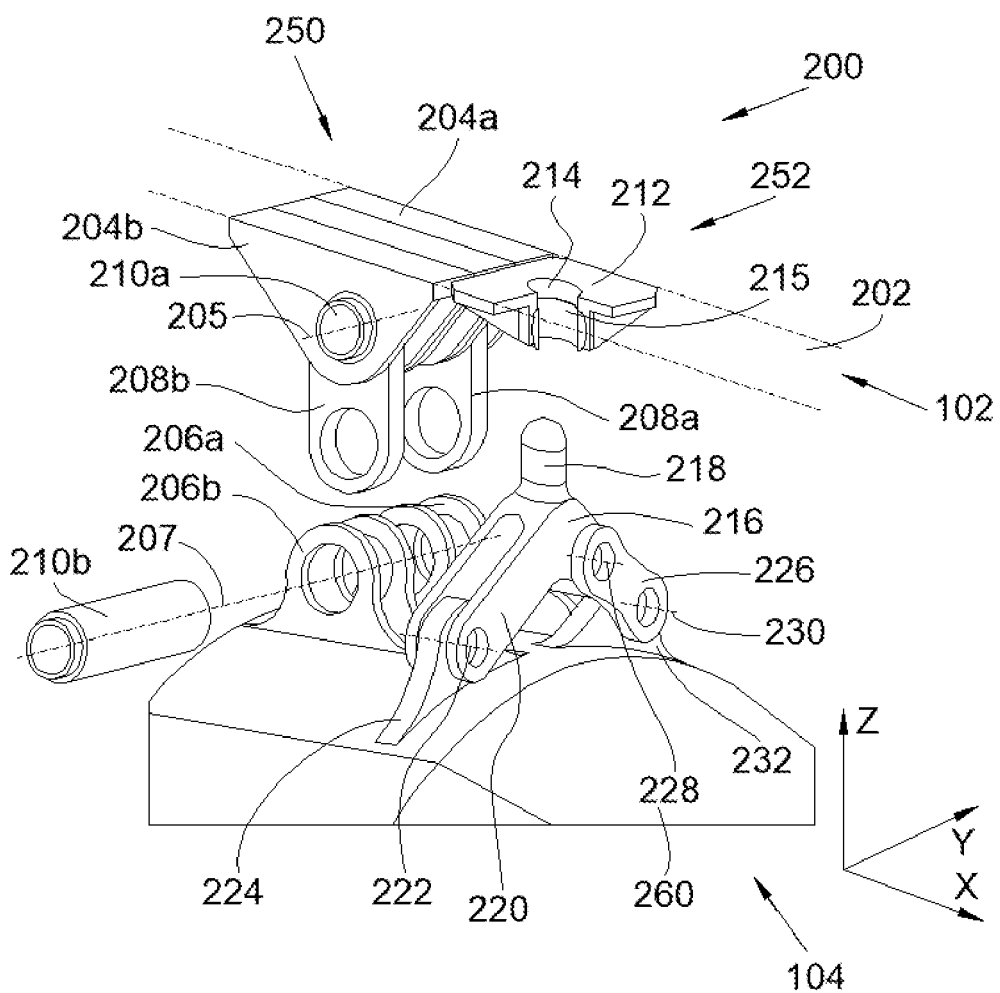
FIG. 2 is an exploded perspective view of a rear engine attachment according to the invention.

The structural casing is fixed to the pylon 102 by, inter alia, a front engine attachment at the front and a rear engine attachment at the rear. FIG. 2 shows a rear engine attachment 200 which is fixed between the pylon 102 and the structural casing 260 of the engine 104.

The pylon 102 has a lower face 202 which is generally horizontal and oriented toward the ground.

The rear engine attachment 200 has a first part 250 which has:
- a first port-side clevis 204a fixed to the lower face 202 of the pylon 102, for example using bolts,
- a first starboard-side clevis 204b fixed to the lower face 202 of the pylon 102, for example using bolts, wherein the two first clevises 204a-b have a common first clevis axis 205 oriented parallel to the transverse direction Y; the first clevis axis 205 is thus horizontal and perpendicular to the longitudinal direction X,
- a second port-side clevis 206a fixed to the structural casing 260 of the engine 104, for example using bolts,
- a second starboard-side clevis 206b fixed to the structural casing 260 of the engine 104, for example using bolts, wherein the two second clevises 206a-b have a common second clevis axis 207 oriented parallel to the transverse direction Y; the second clevis axis 207 is thus horizontal and perpendicular to the longitudinal direction X and parallel to the first clevis axis 205,
- a port-side connecting rod 208a mounted so as to be articulated between the first port-side clevis 204a and the second port-side clevis 206a,
- a starboard-side connecting rod 208b mounted so as to be articulated between the first starboard-side clevis 204b and the second starboard-side clevis 206b,
- a first shaft 210a which realizes the connection between the port-side connecting rod 208a and the first port-side clevis 204a, on the one hand, and the connection between the starboard-side connecting rod 208b and the first starboard-side clevis 204b, on the other hand, and
- a second shaft 210b which realizes the connection between the port-side connecting rod 208a and the second port-side clevis 206a, on the one hand, and the connection between the starboard-side connecting rod 208b and the second starboard-side clevis 206b, on the other hand.

To this end, each clevis 204a-b, 206a-b and each connecting rod 208a-b have bores into which the shafts 210a-b fit.

The first clevis axis 205 and the second clevis axis 207 are at a distance from one another.

The port-side connecting rod 208a is thus mounted so as to be able to move in rotation about the first clevis axis 205 at a first end and so as to be able to move in rotation about the second clevis axis 207 at a second end.

The starboard-side connecting rod 208b is thus mounted so as to be able to move in rotation about the first clevis axis 205 at a first end and so as to be able to move in rotation about the second clevis axis 207 at a second end.

In this embodiment, the forces in the vertical direction Z and the torque Mx around the longitudinal direction X are reacted by the first part 250.

The first part 250 is symmetric with respect to the median plane XZ.

The rear engine attachment 200 has a second part 252 which has a shoe 212 fixed to the lower face 202 of the pylon 102, for example using bolts, and having a bore 214 of which the axis is parallel to the vertical direction Z and placed in the median plane XZ.

The second part 252 also has a main rod 216, in this case on the starboard side, which bears a vertical peg 218 engaging in the bore 214 of the shoe 212, and which is fixed to the structural casing 260 by a first pivot connection of which the axis 222 is parallel to the longitudinal direction X. To this end, the main rod 216 has a main clevis 220 which is mounted so as to be articulated on a wall 224 of the structural casing 260.

The connection between the vertical peg 218 and the bore 214 of the shoe 212 forms a ball joint. To this end, the bore 214 is equipped with a ball 215 which is mounted so as to be free to rotate in the bore 214 and which has a central bore in which the vertical peg 218 engages. This ball joint allows freedom in the X direction and reaction of the forces in the Y direction.

The second part 252 also has a secondary rod 226, in this case on the port side, which is fixed, on the one hand, to the main rod 216 by a second pivot connection of which the axis 228 is parallel to the longitudinal direction X, and, on the other hand, to the structural casing 260 by a third pivot connection of which the axis 230 is parallel to the longitudinal direction X. To this end, the secondary rod 226 has a secondary clevis which is mounted so as to be articulated on a wall 232 of the structural casing 260. The secondary rod 226 is designed to react the forces generated by the thermal expansion of the engine.

The second pivot connection is realized in this case by a connection of the clevis type between the main rod 216 and the secondary rod 226.

The positions of the main rod 216 and the secondary rod 226 may be reversed.

In this embodiment, the forces in the transverse direction Y are reacted by the peg 218 in the bore 214 of the shoe 212.

Such a rear engine attachment 200 is thus more compact, taking up space in the longitudinal direction X and thus minimizing the space taken up in the transverse direction Y, and the reactions of the forces are split between the two parts 250 and 252. The increased compactness makes it possible to improve the aeronautical shapes around the rear engine attachment 200.

Furthermore, the assembly and disassembly of the rear engine attachment 200 are now simplified. Specifically, in order to release the engine 104, it is sufficient to withdraw the first shaft 210a or the second shaft 210b laterally. This is in contrast to a rear engine attachment of the prior art which requires longitudinal disassembly which is carried out in a more crowded space.

According to a preferred embodiment, the first part 250 is disposed at the rear of the second part 252 relative to the longitudinal direction X, but according to another embodiment, the positions may be reversed, and the second part 252 is then disposed at the rear of the first part 250.

Thus, the aircraft 10 according to the invention has the pylon 102, the engine 104 and a rear engine attachment 200, wherein each first clevis 204*a-b* is fixed to the lower face 202, wherein each second clevis 206*a-b* is fixed to the structural casing 260, wherein the shoe 212 is fixed to the lower face 202, and wherein the main rod 216 and the secondary rod 226 are fixed to the structural casing 260.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rear engine attachment for an aircraft, configured to be fixed between a pylon having a lower face and an engine having a structural casing, said rear engine attachment having a first part and a second part,
   wherein the first part comprises:
      a first port-side clevis configured to be fixed to the lower face,
      a first starboard-side clevis configured to be fixed to the lower face,
   wherein the two first clevises have a common first clevis axis which is horizontal and perpendicular to a longitudinal direction,
      a second port-side clevis configured to be fixed to the structural casing,
      a second starboard-side clevis configured to be fixed to the structural casing,
   wherein the two second clevises have a common second clevis axis which is parallel to the first clevis axis,
      a port-side connecting rod mounted so as to be articulated between the first port-side clevis and the second port-side clevis,
      a starboard-side connecting rod mounted so as to be articulated between the first starboard-side clevis and the second starboard-side clevis,
      a first shaft which realizes a connection between the port-side connecting rod and the first port-side clevis, and a connection between the starboard-side connecting rod and the first starboard-side clevis, and
      a second shaft which realizes a connection between the port-side connecting rod and the second port-side clevis, and a connection between the starboard-side connecting rod and the second starboard-side clevis,
   wherein the second part has:
      a shoe configured to be fixed to the lower face and having a bore of which the axis is parallel to a vertical direction,
      a main rod which bears a vertical peg engaging in the bore and which is configured to be fixed to the structural casing by a first pivot connection having an axis parallel to the longitudinal direction,
      a secondary rod which is fixed to the main rod by a second pivot connection having an axis parallel to the longitudinal direction, and which is configured to be fixed to the structural casing by a third pivot connection having an axis parallel to the longitudinal direction.

2. The rear engine attachment according to claim 1, wherein the main rod is on the starboard side, and wherein the secondary rod is on the port side.

3. The rear engine attachment according to claim 1, wherein the first part is disposed at the rear of the second part relative to the longitudinal direction.

4. The rear engine attachment according to claim 1, wherein the second part is disposed at the rear of the first part relative to the longitudinal direction.

5. The rear engine attachment according to claim 1, wherein the bore is equipped with a ball which is mounted so as to be free to rotate in the bore and which has a central bore in which the vertical peg engages.

6. An aircraft having a pylon having a lower face, an engine having a structural casing and a rear engine attachment according to claim 1,
   wherein each first clevis is fixed to the lower face,
   wherein each second clevis is fixed to the structural casing,
   wherein the shoe is fixed to the lower face, and
   wherein the main rod and the secondary rod are fixed to the structural casing.

* * * * *